(12) United States Patent
Madsen

(10) Patent No.: US 10,162,095 B2
(45) Date of Patent: Dec. 25, 2018

(54) BACKLIGHTING FOR A BUTTON ASSEMBLY AND METHOD

(71) Applicant: Control4 Corporation, Salt Lake City, UT (US)

(72) Inventor: Brent Delbert Madsen, Providence, UT (US)

(73) Assignee: Control4 Corporation, Salt Lake City, UT (US)

( * ) Notice: Subject to any disclaimer, the term of this patent is extended or adjusted under 35 U.S.C. 154(b) by 216 days.

(21) Appl. No.: 14/997,083

(22) Filed: Jan. 15, 2016

(65) Prior Publication Data

US 2017/0205560 A1 Jul. 20, 2017

(51) Int. Cl.
*F21V 8/00* (2006.01)
*F21V 23/04* (2006.01)
*H01H 13/02* (2006.01)
*H01H 13/83* (2006.01)

(52) U.S. Cl.
CPC ......... *G02B 6/0045* (2013.01); *G02B 6/0065* (2013.01); *G02B 6/0095* (2013.01); *H01H 13/023* (2013.01); *H01H 13/83* (2013.01); *H01H 2219/03* (2013.01); *H01H 2219/056* (2013.01); *H01H 2219/06* (2013.01); *H01H 2219/062* (2013.01); *H01H 2219/064* (2013.01); *H01H 2229/046* (2013.01)

(58) Field of Classification Search
CPC .. G02B 6/0035; G02B 6/0045; G02B 6/0065; H01H 13/023; H01H 2219/062; F21S 23/04; F21V 23/04; H01R 13/717; H01R 13/7175
See application file for complete search history.

(56) References Cited

U.S. PATENT DOCUMENTS

| | | | | |
|---|---|---|---|---|
| 5,349,504 A * | 9/1994 | Simms | ................ | F21V 7/0091 362/249.02 |
| 6,336,825 B1 * | 1/2002 | Seefried | ............... | G02B 6/4204 439/488 |
| 7,193,170 B2 * | 3/2007 | Katayama | ............ | H01H 13/023 200/310 |
| 7,424,386 B2 * | 9/2008 | Tsubota | ............... | H03K 17/975 702/150 |
| 7,458,708 B2 * | 12/2008 | Sheng | .................. | F21S 48/215 362/551 |
| 7,670,039 B2 * | 3/2010 | Altonen | ............... | G02B 6/0001 200/314 |
| 7,888,614 B2 * | 2/2011 | Pippel | ................. | H01H 13/023 200/314 |
| 8,436,752 B2 * | 5/2013 | Chen | .................... | G02B 6/0035 341/20 |
| 8,506,112 B1 * | 8/2013 | Dau | .......................... | F21S 8/04 362/217.05 |

(Continued)

*Primary Examiner* — Peggy Neils
(74) *Attorney, Agent, or Firm* — Austin Rapp

(57) ABSTRACT

A button assembly is described. The button assembly includes a button that includes a translucent interior material and an opaque front surface with at least one aperture through which light can pass. The button assembly also includes a light guide that includes a light transmitting material and a reflector. The light guide is a molded part where the light transmitting material is molded with the reflector as an integral part of the light guide. The light guide provides illumination to a back surface of the button.

21 Claims, 12 Drawing Sheets

(56) References Cited

U.S. PATENT DOCUMENTS

| | | | | |
|---|---|---|---|---|
| 9,022,631 | B2* | 5/2015 | Mulder | G02B 6/006 |
| | | | | 362/601 |
| 9,082,313 | B1* | 7/2015 | McCarthy | G09B 15/023 |
| 9,389,769 | B1* | 7/2016 | O'Keeffe | G06F 1/3262 |
| 9,411,083 | B2* | 8/2016 | Angelini | G02B 6/0008 |
| 2007/0201217 | A1* | 8/2007 | Imai | H01H 13/023 |
| | | | | 362/23.21 |

* cited by examiner

BACKLIGHTING FOR A BUTTON ASSEMBLY AND METHOD

TECHNICAL FIELD

The present disclosure relates generally to electrical switches, and more particularly, to modular switching elements for use in homes, office buildings, and the like.

BACKGROUND

A wide variety of switches are used to control electrical devices. Such switches range in function from simple on/off switches that simply open and close circuits, to digital switches capable of transmitting wireless commands for home automation or the like. As applied to homes, office buildings, and other structures, buttons can be used to control a wide variety of electrical devices such as lights, appliances, security systems, window coverings, heating and cooling equipment, and the like. Many structures have a plethora of buttons, which may detract from the aesthetics of the space.

Further, a large number of buttons can be confusing for users. When faced with an array of buttons, it can be a daunting prospect for a user to determine or remember which button controls a given electrical device. Text or symbols may be included on the buttons. However, the text or symbols may be difficult to read in a low light environment.

It would be advantageous to provide a button assembly with backlighting. The backlit button assembly may avoid disruption to interior aesthetics and may improve navigation by a user. It would be a benefit to provide switching systems with buttons that are readily distinguishable from each other.

SUMMARY

A button assembly is described. The button assembly includes a button having a translucent interior material and an opaque front surface with at least one aperture through which light can pass. The button assembly also includes a light guide having a light transmitting material and a reflector. The light guide is a molded part where the light transmitting material is molded with the reflector as an integral part of the light guide. The light guide provides illumination to a back surface of the button.

The light guide may be configured with an illumination surface on the light transmitting material. The light guide may also be configured with at least one light port located opposite the illumination surface. The illumination surface may curve outward from the at least one light port in at least one location.

Light entering the light port may be distributed evenly through the light guide without forming a hot spot of concentrated light. The illumination surface may curve outward in two directions at a point located a distance from the at least one light port.

The reflector may be molded to the light transmitting material opposite the illumination surface. The reflector may be configured with a curved surface that differs from the illumination surface curve. The reflector may be a reflecting material such that a high percentage of light that interacts with the reflector is reflected towards the illumination surface rather than refracted through a back surface of the light guide.

The light guide may mate inside the button and illuminate the back surface of the translucent interior material of the button. The light guide may have a snap-fit geometry to attach to the button.

The light guide may be formed in a two-shot injection molding process in which the light transmitting material is molded with the reflector. The light transmitting material of the light guide may be a moldable transparent or translucent plastic and the reflector may be a moldable opaque or semi-opaque plastic.

The translucent interior material of the button may be a transparent plastic with a percentage of a diffusing agent to enhance distribution of light provided by the light guide within the button.

The light guide may include a plurality of light ports corresponding to increments of unit sizes of the button assembly. The plurality of light ports may compound light from each of a plurality of light sources to provide backlighting over a larger illumination surface than that of a light guide having a single light port.

A light guide for a button assembly is also described. The light guide includes a light transmitting material and a reflector. The light guide is a molded part where the light transmitting material is molded with the reflector as an integral part of the light guide. The light guide provides illumination to a back surface of a button.

A method for providing a light guide is also described. The method includes molding the light guide with a light transmitting material and a reflector. The light transmitting material is molded with the reflector as an integral part of the light guide. The light guide is configured to provide illumination to a back surface of a button.

DETAILED DESCRIPTION

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
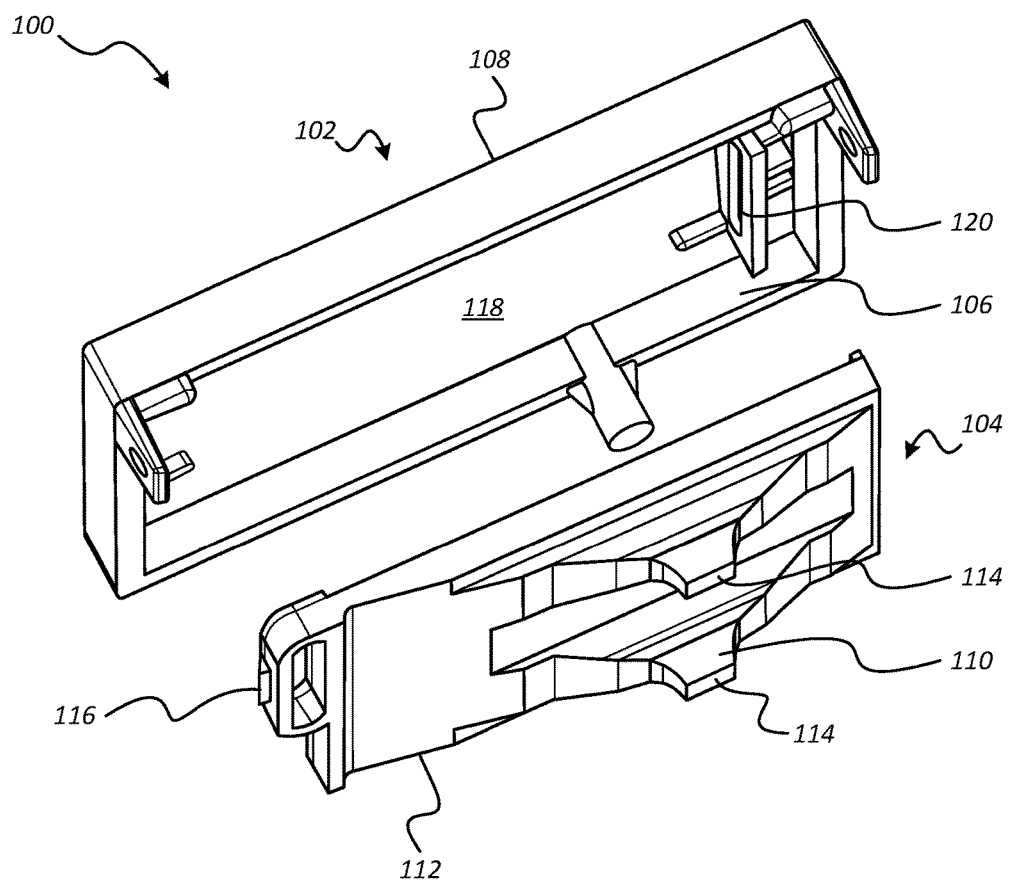
FIG. 1 is an exploded perspective view illustrating an implementation of a button assembly according to the described systems and methods.

Referring to FIG. 1, an exploded perspective view illustrates an implementation of a button assembly 100 according to the described systems and methods. The button assembly 100 may be included in a switching system for controlling electrical devices. An electrical device may include devices such as lights, fans, window coverings, electrical appliances, entertainment systems, security systems, and the like.

A switching system may have connectors that connect the switching system to one or more electrical devices. By way of example, the connectors may include electrical terminals or the like that enable a wired connection to be made with an electrical device via electrical wiring. The connectors may also include one or more wireless communications devices that enable a wireless connection to be made with an electrical device via a wireless signal.

The electrical wiring may be part of an electrical system of an inhabited structure, such as a 110 Volt or 220 Volt 50 Hz or 60 Hz Alternating Current (A/C) system. Thus, the electrical wiring may include wiring of a type commonly used in the construction of such electrical systems. Alternatively, the electrical wiring may exist apart from such an electrical system, and may thus include wiring designed to operate at a different current and/or voltage.

The button assembly 100 may be included in a switch panel. In order to identify the function of various buttons on a switch panel, it is desirable to engrave the button function on the front surface of the button. The engraved graphics may be illuminated with a backlight. Providing consistent backlighting across the back of the button to assist visibility of the engraved graphics and to allow for various sizes of buttons that are removably configurable is a significant challenge. Also, it is desirable to eliminate light leakage around the perimeter of, and in between, the buttons 102.

There are several approaches to backlit buttons. Most approaches are of a fixed nature where the sizes and locations are fixed and not variable in size or location in an array of buttons in a switch panel. One approach to lighting a button is edge lighting. With edge lighting, light is sent across a thin film and picked it up at various spots. However, edge lighting is problematic in the context of a switching system in that it does not allow flexibility in the type of button used and the size constraints of a switch panel.

Figure 6:
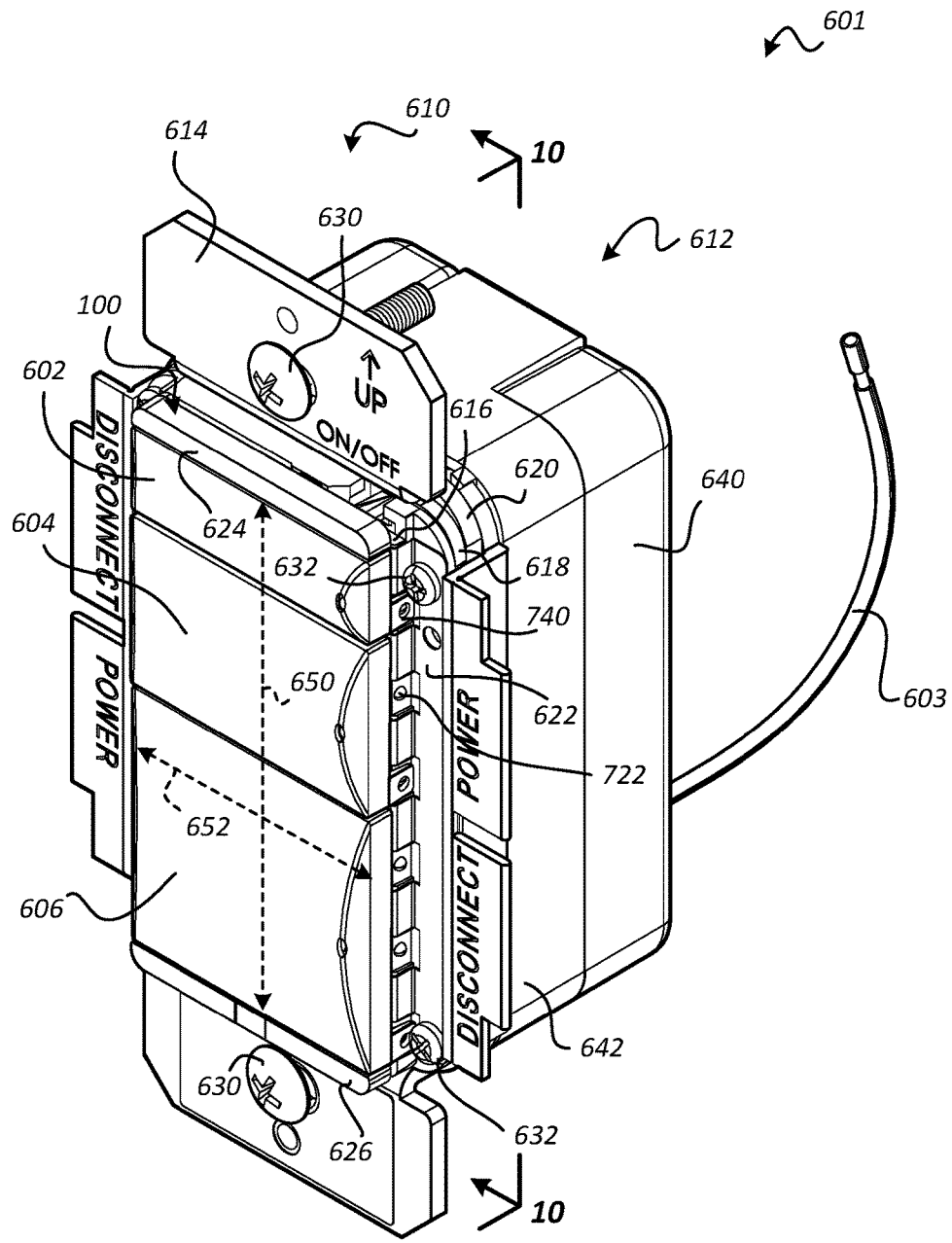
FIG. 6 is a perspective view illustrating a switching system that may include a button assembly of FIG. 1, in a fully-assembled state.
Figure 7:
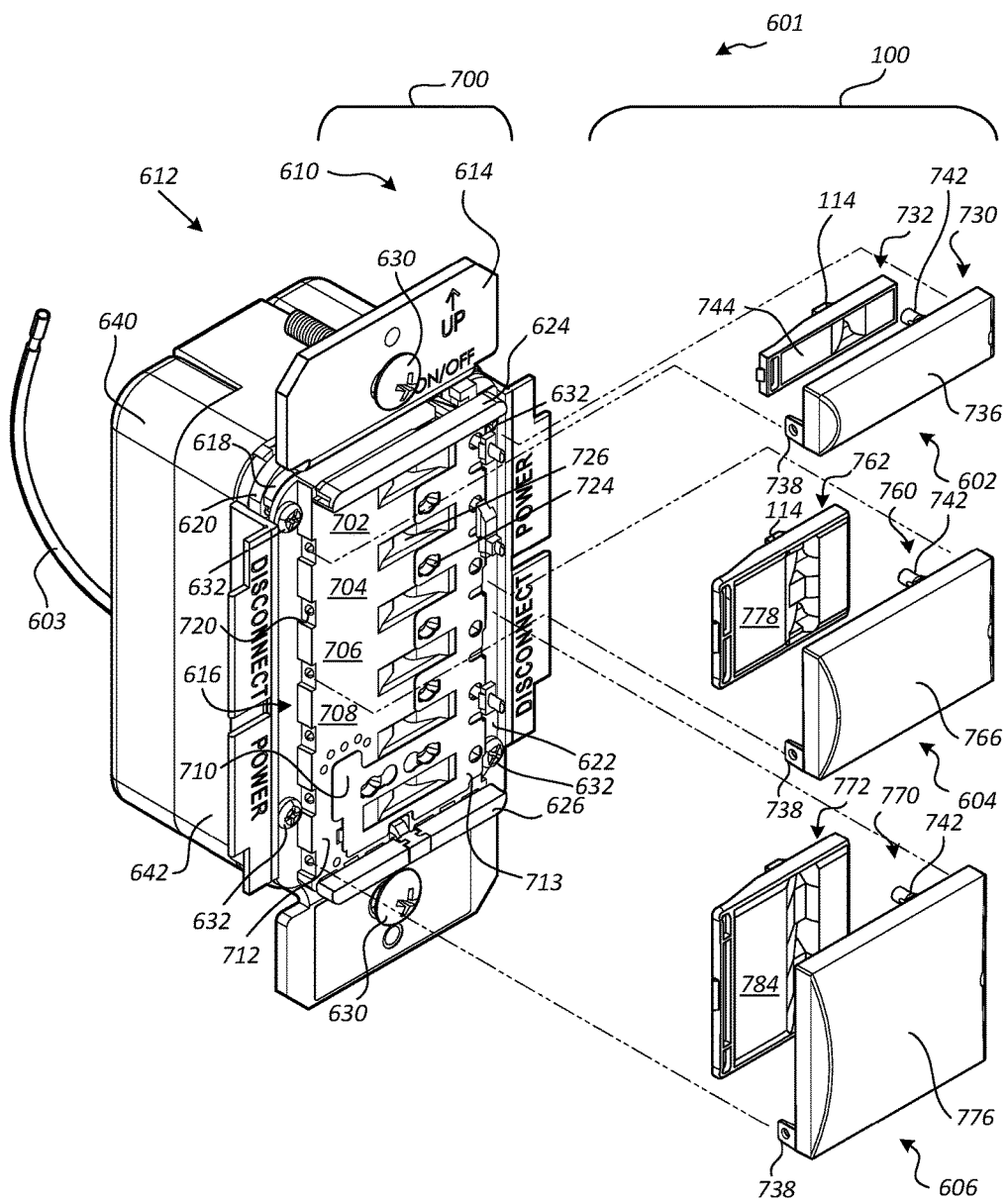
FIG. 7 is an exploded, perspective view illustrating the switching system of FIG. 6.

Another challenge in lighting a button is providing one or more recessed light sources and providing configurability in the type and size of button that is used. The light sources (e.g., light emitting diode (LED) lights) may not be that far recessed from where the viewing surface is located. Furthermore, a button 102 may be different types and sizes. For example, a switch panel may have a button 102 that is a full rocker size. Or the switch panel may be reconfigured with a different array of buttons 102 in any manner or sequence. For example, multiple single-unit high buttons 102 may be used in a switch panel. Also, different combinations of different of sizes (e.g., triple-unit high or double-unit high sizes) may be desired. Buttons 102 of different sizes are depicted in FIG. 6 and FIG. 7.

Therefore, a challenge with lighting a button is giving the operator or end-user the opportunity to custom configure this by just snapping in a button in the position where they want it while transferring the light to any one of these multiple different surface configurations. The light may come from a back position where the light is set back away from the buttons 102. To improve legibility and aesthetic appeal, this light should be spread out consistently across the back surface 118 of a button 102.

Where buttons are backlit with a flood of light across the back surface of the array of buttons, light leakage bleeds between the gaps between the buttons and interferes with the visibility of the backlit button function. Furthermore, light leakage becomes a nuisance in a room where the light is a distraction. Another issue is eliminating the region of concentrated light (referred to herein as a hot spot) directly in front of a light source (e.g., LED element). For example, even LEDs that are provided with a lens system to spread the light distribution angle have a hot spot where the light is more concentrated. This hot spot is undesirable and detracts from the readability of the graphics on the buttons.

A light guide may be used to illuminate a button. A light guide is a structure that transports light from a light source to another point at some distance. In an approach, the light guide is located on the back of the button and requires a separate reflector film which is applied to the light guide with an adhesive. This approach typically also requires the installation of a diffuser film placed between the light guide and the button.

In this approach, the separate reflector film is laser or die cut and laid out in a pattern. A tool is used that presses the separate reflector film onto the light guide. Also, the separate reflector film is heat-staked into place on the light guide. This approach, suffers from problems. For example, having a separate reflector that has to be heat-staked and bonded to the light guide using adhesive increases fabrication time and may introduce inconsistent results in manufactured parts.

The button assembly 100 described herein utilizes a combination of a light guide 104 and a button 102. The button 102 may be pressed by a user on the outer surface 108 to trigger an event. A variety of different types of buttons 102 may be used. In an implementation, the button 102 may provide binary functionality (e.g., on/off) when the button is pressed. In another implementation, the button 102 may be a rocker, which may be moved by the user to either of two positions to carry out two distinct switching functions. Other examples of a button 102 type include a split button, a key for a key pad, and the like.

The button 102 may be may be formed of a translucent interior material 106 and an opaque front surface 108. The front surface 108 may have a thickness and material composition selected to block the transmission of light traveling through the translucent interior material 106 such that the light does not show through the front surface 108. The opaque material of the front surface 108 may extend around the sides of the button 102 to further restrict transmission of the backlight. In an implementation, the opaque material of the front surface 108 may be a paint applied by a spray means, silk screened, or applied with an applique or decal. The opaque front surface 108 may also be a vapor deposed metallic or polymeric material or a powder coated polymer material.

The front surface 108 may have at least one aperture through which light can pass. As used herein, an aperture is a hole or an opening through which light travels. The aperture may expose the translucent interior material 106 and allow light to be visible on the front surface 108. In an implementation, the aperture may be formed in the opaque front surface 108 using etching (e.g., laser or acid etching). In another implementation, the aperture may be formed by mechanically removing the opaque material of the front surface 108 to expose the translucent interior material 106. In another implementation, the front surface 108 may be molded to create the aperture. In yet another implementation, there may be a translucent paint applied underneath the opaque paint of the front surface 108 and on top of the translucent interior material 106. The translucent paint may be white or other colors.

Examples of an aperture on the button 102 include text and symbols. The text may describe the function of button 102. The text may include multiple lines of text on the button 102. Symbols, characters, graphics and shapes on the front surface 108 may also provide information to the user. Therefore, light may illuminate the text or symbols as it passes through the translucent interior material 106.

The translucent interior material 106 may have a thickness and material composition selected to provide translucency such that light provided to the back surface 118 of the button 102 shows through the one or more apertures on the front surface 108 and is visible to the user. In another implementation, the interior material 106 may be transparent. In an implementation, the translucent interior material 106 may be a clear thermoplastic such as polycarbonate (e.g., Lexan™ polycarbonate) styrene, acrylic (PMMA), ABS, SAN, or other thermoplastic material.

In order to provide a screen-like surface to project the light on, the translucent interior material 106 of the button 102 may be infused with a diffusing agent. Examples of a diffusing agent include a white translucent pigment, microbubbles, inorganic or inorganic particles that may tint, diffuse or redirect the transmission of light. This diffusing agent allows the button 102 to enhance the distribution of the backlighting. This material may act as a diffuser in the translucent interior material 106. The translucent interior material 106 of the button 102 may be a transparent plastic with a percentage of a diffusing agent to enhance distribution of light provided by the light guide 104 within the button 102. In an implementation, the translucent interior material 106 may be infused with a percentage of white pigment, such as titanium oxide, zinc oxide or an organic thermoplastic pigment. Another example of a diffusing agent includes the Lexan™ FXD material, which has a proprietary diffusing additive that is not white. In yet another implementation, the back surface 118 of the button 102 may have a slight texture on it to further diffuse backlighting.

The light guide 104 may include a light transmitting material 110 and a reflector 112. The light guide 104 may receive light in one or more light ports 114. A light port 114 may be a surface of the light transmitting material 110 through which light may enter the light guide 104. Each of the one or more light ports 114 may receive light from a separate light source or a single common light source (not shown). An example of a light source is an LED. The implementation shown in FIG. 1 includes two light ports 114 corresponding to a 2-unit (i.e., double-high) sized light guide 104. However, it should be noted that the light guide 104 may include any number of light ports 114.

The light transmitting material 110 may have a thickness and material composition selected to provide transparency such that light provided to the one or more light ports 114 is distributed and managed through the light transmitting material 110 to an illumination surface 218, as shown and described in connection with FIG. 2. The illumination surface 218 may be located opposite the one or more light ports 114.

The light guide 104 also has a built-in reflector 112. The reflector 112 may have a thickness and material composition selected to provide opacity such that all light that interacts with the reflector 112 is reflected towards the illumination surface 218 rather than refracted through a back surface of the light guide 104.

The light guide 104 may be a molded part where the light transmitting material 110 is molded with the reflector 112 as an integral part of the light guide 104. The reflector 112 may be molded to the light transmitting material opposite the illumination surface 218. In an implementation, the light guide 104 may be formed in a two-shot injection molding process in which the light transmitting material 110 is over-molded with the reflector 112 material. In another implementation, the light guide 104 may be formed in a two-shot injection molding process in which the reflector 112 is over-molded with the light transmitting material 110. Using a two-shot injection molding process may allow molding one part using two different materials.

In an implementation, a mold for the light guide 104 may have two cavities. The light transmitting material 110 may be injected into a first cavity. The reflector 112 material may then be injected into a second cavity. After sufficient part cooling, the light guide 104 may be ejected from the mold.

The use of a two-shot injection molding process may avoid problems (e.g., time, labor, dimensional accuracy) associated with attaching a separate reflector 112 with adhesive. Some benefits of forming the light guide 104 in a two-shot injection molding process include the elimination of secondary operations (e.g., attaching the reflector 112), lower part cost, and consistent fabrication. Another advantage of the co-molded reflector 112 is that the reflector 112 is comprised of a single surface. In the approach with an adhesive-applied reflector, the light must travel through the refractive boundary surface of the plastic light guide, through the adhesive and reflect off the surface of the applied film, then back through the adhesive and the refractive boundary of the light guide. In this approach, a significant amount of light is lost and not transmitted to the illumination surface.

The light transmitting material 110 may be a moldable transparent plastic. Examples of moldable transparent plastic include polycarbonate (e.g., Lexan™ polycarbonate) styrene, acrylic (PMMA), ABS, SAN, or other thermoplastic material.

The reflector 112 may be a moldable opaque plastic. In an implementation, the reflector 112 may be a plastic material such that a high percentage or all light that interacts with that boundary is completely reflected towards the surface intended to be illuminated (i.e., the planar surfaces 219 of the illumination surface 218 as well as partially through the curved surfaces 220) rather than refracted through the back surface of the light guide 104. The reflector 112 may be a white reflecting material or the reflector 112 may also be a metallic material, light grey or a color that absorbs certain wavelengths of light such as red or green or blue.

In another implementation, the reflector 112 may be a moldable semi-opaque plastic. Depending on the percentage of pigment and the thickness of the reflector 112 material, some light may pass through the reflector 112. In this case, the reflector 112 may still provide adequate opacity to reflect a high percentage of light toward the illumination surface 218 without being completely opaque.

Figure 3:
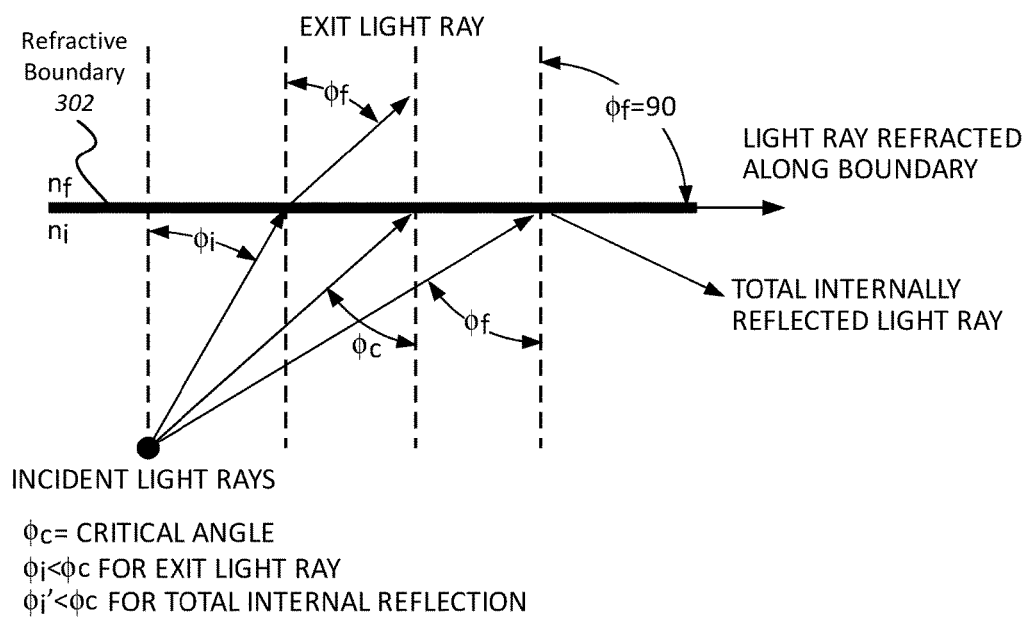
FIG. 3 is a graph illustrating the phenomena of incident light rays, internally reflected light rays and exit light rays on a flat surface.

The light guide 104 may have a geometry designed to take advantage of the angle of refraction to distribute the light evenly without forming a hot spot. FIG. 3 illustrates the phenomena of incident light rays, internally reflected light rays and exit light rays on a flat surface.

Using one or more curved surfaces in the light guide 104, light may be reflected and refracted within the light transmitting material 110 and evenly dispersed across the back surface 118 of the button 102. By considering the known critical angle of the materials in the light guide 104, curved surfaces may be constructed that internally reflect and refract the light to provide a more even distribution of the light.

The illumination surface 218 may curve outward from the at least one light port 114 in at least one location. In an implementation, the illumination surface 218 curves outward in two directions at a point located a distance from a light port 114. The reflector 112 may also have a curved surface. The curved surface of the reflector 112 may differ from the illumination surface curve. An example of the curved surfaces of the light guide 104 is described in connection with FIG. 4 below.

The light guide 104 may mate inside the button 102. The button 102 may be formed with a cavity that is open on the back surface 118 of the button 102. The light guide 104 may attach to the button 102 within this cavity. The illumination surface 218 of the light guide 104 may face the back surface 118 of the button 102. The light that travels through the light guide 104 may illuminate the back surface 118 of the translucent interior material 106 of the button 102. The light may then travel through the translucent interior material 106 and illuminate the one or more apertures (e.g., text or graphic) on the front surface 108 of the button 102.

To aid in assembly of the button assembly 100, the light guide 104 may have a snap-fit geometry to attach to the button 102. In an implementation, the light guide 104 may have a spring-loaded snap structure 116 that snaps into an opening on the button 102. The opposite side of the light guide 104 may have a corresponding catch that snaps into an opening 120 on the opposite side of the button 102. The spring-loaded snap structure 116 and other snap-fit structures may be molded into the light guide 104 as part of the reflector 112 material. The snap-fit geometry may simplify the installation and removal of the light guide 104 within the button 102.

The button assembly 100 may be sized in unit sizes. For example, the button assembly 100 may be sized in increments of 1, 2, 3 or more unit sizes. Each unit size may defined by an incremental distance between a light source providing the backlight. Each incremental size button assembly 100 may have a light guide 104 that compounds the light from each of several light sources to provide backlighting over a larger surface. This may enable a larger graphics character, or several rows of text or a combination of graphics and text on the front surface 108 of the button 102.

In an implementation, the light guide 104 includes a plurality of light ports 114 corresponding to increments of unit sizes of the button assembly 100. The plurality of light ports 114 may compound light from each of a plurality of light sources to provide backlighting over a larger illumination surface 218 than that of a light guide 104 having a single light port 114. In other words, to provide more backlighting for a larger button 102, a light guide 104 with multiple light ports 114 may be used. It should be noted that a button 102 may have a unit size that is the same as or larger than the light guide 104. For example, a 6-unit high rocker button 102 may have a 2-unit high light guide 104 to provide illumination to text located in the middle of the rocker button.

Figure 2:
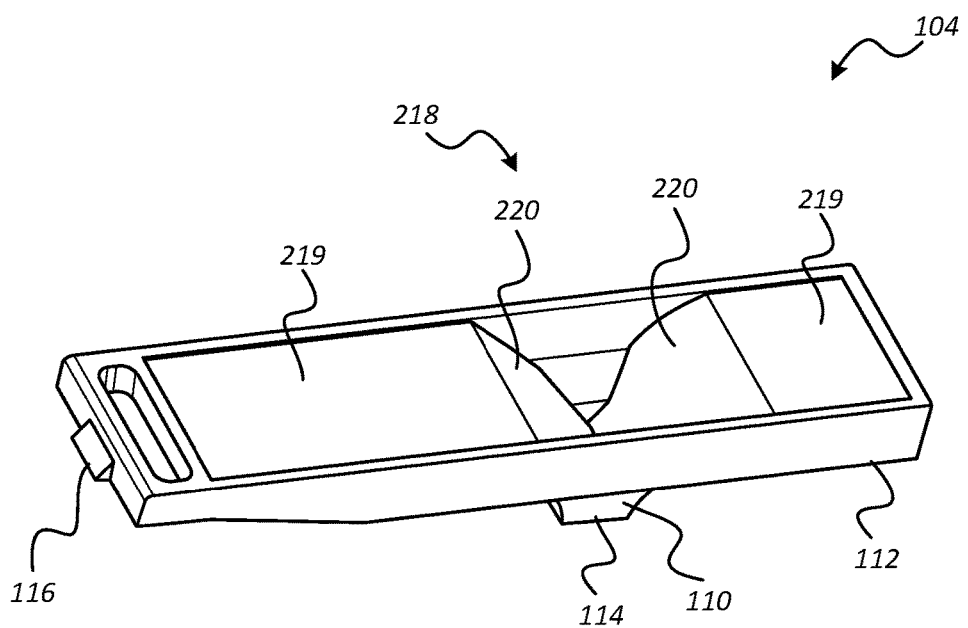
FIG. 2 is a perspective view illustrating a front side of a light guide.

Referring to FIG. 2, a perspective view illustrates a front side of the light guide 104. The light guide 104 in FIG. 2 is a single-unit high light guide 104 that may be used in a single-unit high button 102 or larger button 102. Various sizes for buttons 102 are depicted in FIG. 6 and FIG. 7.

As shown, the light guide 104 has a single light port 114. As mentioned above, a light guide 104 may have one or more light ports 114. An example of a light guide 104 with two light ports 114 was described in connection with FIG. 1. An example of a light guide 104 with three light ports 114 is described in connection with FIG. 5.

As described above, the illumination surface 218 is a surface opposite the light port 114. The illumination surface 218 and the light port 114 may be formed from the same light transmitting material 110. For example, the illumination surface 218 and the light port 114 may be formed when the light transmitting material 110 is molded.

Light that enters the light port 114 may be distributed through the light transmitting material 110 and evenly dispersed across the illumination surface 218. In an implementation, the illumination surface 218 may be a polished surface. In another implementation, some or the entire illumination surface 218 may be textured. The polished surface may be a feature of the molding process, or the illumination surface 218 may be polished after molding in a secondary procedure.

The illumination surface 218 may be formed with one or more planar surfaces 219 and one or more curved surfaces 220. The planar surfaces 219 may be configured to be in-plane with the back surface 118 of the button 102. The planar surfaces 219 may also be configured to be in-plane with the light port 114 surface. It should be noted that the back surface 118 of button 102 may be curved or flat. Therefore, the back surface 118 of button 102 is not necessarily in plane with surface 218.

In the implementation shown in FIG. 2, the illumination surface 218 curves outward in two directions at a point located a distance from the light port 114. The curved surfaces 220 on the illumination surface 218 disperse light across the planar surfaces 219 of the illumination surface 218 and eliminate a hot spot where light enters the light port 114.

Light traveling through the light transmitting material 110 may be reflected off the reflector 112. Light that strikes the reflector 112 may be reflected back to the illumination surface 218. As described above, the light guide 104 may be formed in a two-shot molding process in which the light transmitting material 110 and the reflector 112 are molded together. The over-molding process provides a single illumination surface 218 of incidence of the light.

The light guide 104 may include a spring-loaded snap structure 116, as described in connection with FIG. 1. In the implementation shown in FIG. 2, the spring-loaded snap structure 116 extends across an entire side of the light guide 104. It should be noted that the spring-loaded snap structure 116 may extend across the entire side or it may not. For example, double-unit high light guides 104 and rocker unit light guides 104 may have spring-loaded snap structure 116 with only partial lengths.

Referring to FIG. 3, a graph illustrates the phenomena of incident light rays, internally reflected light rays and exit light rays on a flat surface. A first medium may have a first refractive index ($n_i$) and a second medium may have a second refractive index ($n_f$). The first medium may meet the second medium at a refractive boundary 302.

The critical angle ($\phi_c$) is the angle of incidence ($\phi_i$) above which total internal reflection occurs. The angle of incidence ($\phi_i$) is measured with respect to the normal at the refractive boundary 302. When the incident angle ($\phi_i$) is increased sufficiently, the transmitted angle ($\phi_f$) reaches 90 degrees and no light is transmitted to the second medium.

Therefore, if $\phi_i$ is less than $\phi_c$, the incident light ray may exit the first medium with a given $\phi_f$. This is referred to as refraction, and a light ray that exits the first medium may be referred to as a refracted ray. However, if $\phi_i$, is greater than $\phi_c$, the incident light ray may experience total internal reflection. If $\phi_i$ is equal to $\phi_c$, then the light ray may be refracted along the refractive boundary 302.

By taking advantage of the known critical angle ($\phi_c$) of the light transmitting material 110 in the light guide 104, a curved surface 220 may be constructed that internally reflects and refracts the light to provide a more even distribution of the light, as described in connection with FIG. 4.

Figure 4:
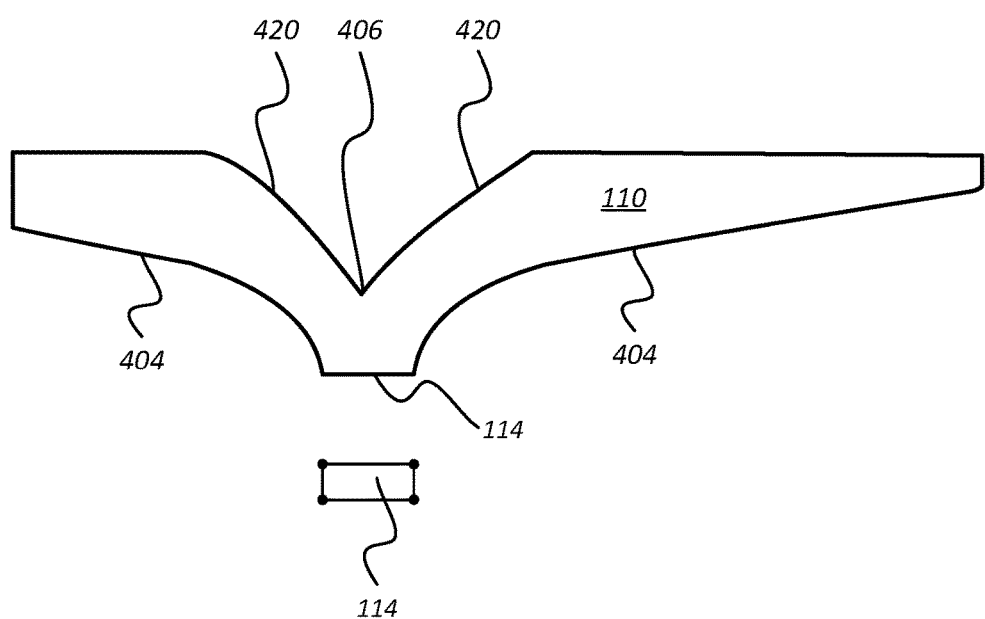
FIG. 4 illustrates an implementation of the refracting and reflecting curved surfaces of the light guide.

Referring to FIG. 4, an implementation of the refracting and reflecting curved surfaces of the light guide 104 are illustrated. The curves 420 correspond to the curved surfaces 220 of the illumination surface 218. The curves 420 are shown opposite the light port 114. The curves 404 of the reflector 112 are shown opposite the curves 420 of the illumination surface 218. It should be noted that in this implementation the light port 114 is not centered.

The illumination surface curves outward in two directions at a point 406 located a distance from the light port 114. Because of the angle created by the curves 420 at this point 406, a high percentage of the light that enters the light port 114 is internally reflected, as described in connection with FIG. 3. As noted above, the reflected/refracted light percentage is proportional to the angle of incidence. This structure may eliminate a hot spot occurring on the button 102 from light entering the light guide 104. The light reflecting off of the curves 420 of the illumination surface 218 may then reflect off of the curves 404 of the reflector 112 and exit out of the illumination surface 218. Through the use of reflection and refraction associated with the geometry of the curves 420, 404 of the light guide 104, light entering the illumination port 114 may be evenly distributed across the illumination surface 218.

Figure 5:
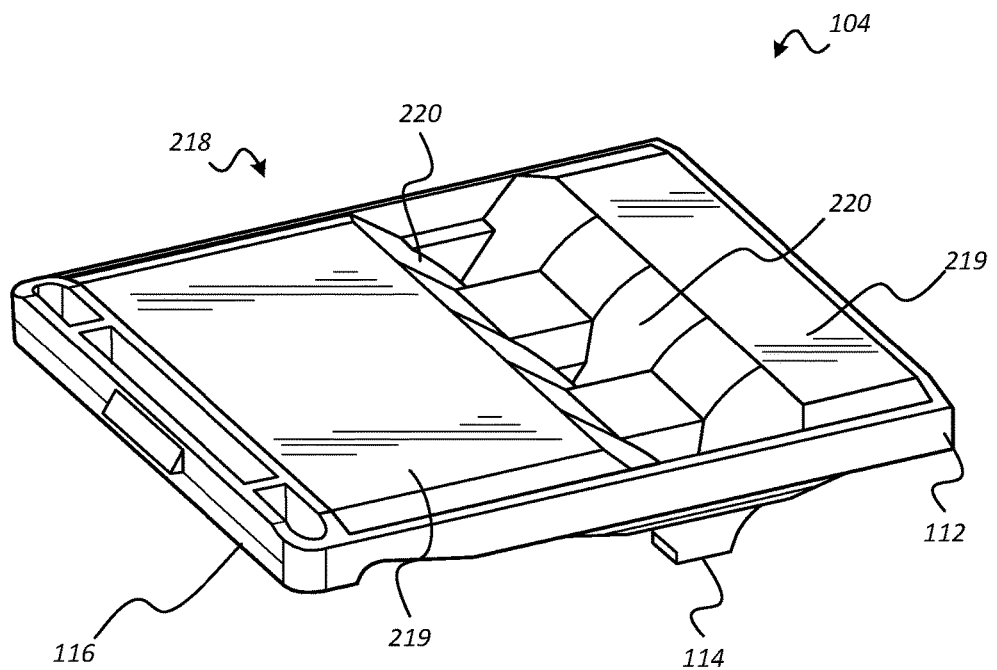
FIG. 5 is a perspective view illustrating a front side of a triple-unit high large light guide.

Referring to FIG. 5, a perspective view illustrates a front side of a triple-unit high large light guide 104. The light guide 104 in FIG. 5 is a triple-unit high light guide 104 that may be used in a triple-unit high (or larger) button 102.

As shown, the light guide 104 has three light ports 114. In this implementation, the three light ports 114 may receive light from three light sources (e.g., LEDs). It should be noted that the three light ports 114 converge to a single curved illumination surface 218 opposite the light ports 114. Light that enters the light port 114 may be distributed through the light transmitting material 110 and evenly dispersed across the illumination surface 218.

As described above, the illumination surface 218 may have one or more planar surfaces 219 and one or more curved surfaces 220. In the implementation shown in FIG. 5, the illumination surface 218 curves outward in two directions at three points located a distance from the light ports 114. The light ports 114 may be separated from each other by the reflector 112 material.

The light guide 104 includes a spring-loaded snap structure 116, as described in connection with FIG. 1. In this implementation, the spring-loaded snap structure 116 extends across an entire side of the light guide 104.

Referring to FIG. 6, a perspective view illustrates a switching system 601 that may include a button assembly 100 of FIG. 1, in a fully-assembled state. The switching system 601 may include a plurality of button assemblies 100, which may include a small button assembly 602, a medium-sized button assembly 604, and a large button assembly 606. The switching system 601 may also include a body 610, which may include several other components.

More precisely, the body 610 may include a shell 612, a mounting flange 614, a keypad 616, and a circuit board 618. The shell 612 may be designed to fit into and/or take the place of a standard junction box. The shell 612 may contain connectors and/or other items used to connect the switching system 601 to the electrical wiring 603 and/or provide the wireless signal. The mounting flange 614 may project outward from the shell 612, and may be used to mount the switching system 601 to a structure such as a wall, junction box, or the like. The keypad 616 may receive the button assemblies 100. The circuit board 618 may receive the user input provided via the button assemblies 100 and initiate the desired action in one or more electrical devices.

The shell 612, the mounting flange 614, the keypad 616, and/or the circuit board 618 may be secured together via a variety of spacers, fasteners, and/or other interconnecting elements. As implemented in FIG. 6, these may include a spacer 620 and a retention plate 622. The spacer 620 may be used to provide the desired spacing between the mounting flange 614 and the circuit board 618. The retention plate 622 may be used to secure the keypad 616, the circuit board 618, and the mounting flange 614 to the shell 612.

In addition to the components listed above, the body 610 may have various other features, which serve ornamental or other functions. Such features may include, but are not limited to, a top trim piece 624, and bottom trim piece 626. The top trim piece 624 may act as an actuator for an air-gap switch or the like. The bottom trim piece 626 may be a support for a "light pipe," which may transmit ambient light to a light sensor (for example, on the circuit board 618) to enable detection of ambient lighting levels.

The body 610 may be attached to a wall or other structure via screws 630, which may be inserted through holes in the mounting flange 614 and into corresponding holes in the applicable mounting structure. The retention plate 622 may be secured to the keypad 616, the circuit board 618, and the mounting flange 614 via screws 632. The screws 632 may pass through holes in the corners of the retention plate 622, and through corresponding holes of the keypad 616, the circuit board 618, and/or the mounting flange 614.

The shell 612 may have multiple parts that fit together to define an interior cavity to hold wire ends, connectors, and the like. More specifically, the shell 612 may have a first portion 640 and a second portion 642, which may be attachable together via screws, snap fittings, or the like.

As shown, the body 610 may be generally rectangular prismatic in shape, and may thus have a length that is greater than its width. The keypad 616 may similarly have a generally rectangular shape with a length 650 and a width 652. The length 650 may be greater than the width 652. The button assemblies 100 may be distributed along the length, and may be positioned adjacent to each other so that only very small gaps exist between the button assemblies 100 that are adjacent to each other.

The button assemblies 100 shown in FIG. 6 may be only some of those that are supplied with the switching system 601. If desired, multiple button assemblies 100 of each type and/or other types not shown in FIG. 6 may be provided. Thus, the button assemblies 100 and/or other buttons not shown in FIG. 6 may be arranged in a variety of configurations. This will be further shown and described subsequently.

Referring to FIG. 7, an exploded, perspective view illustrates the switching system 601 of FIG. 6. As shown, the button assemblies 100 have been removed from the keypad 616 to enable clearer visualization of the button assemblies 100 and the keypad 616. A portion of the keypad 616 may be covered and/or retained by the retention plate 622, as illustrated.

The keypad 616 may have a plurality of positions 700 that may be occupied by the button assemblies 100. Each of the positions 700 may correspond to the smallest of the button assemblies 100, so that other button assemblies 100 occupy more than one of the positions 700. In the implementation of FIG. 7, the positions 700 on the keypad 616 may include a first position 702, a second position 704, a third position 706, a fourth position 708, a fifth position 710, a sixth position 712, and a seventh position 713.

Each of these positions 700 may occupy a generally rectangular area spanning the width 652 of the keypad 616, with the exception of the sixth position 712 and the seventh position 713. The sixth position 712 and the seventh position 713 may be positioned side-by-side such that, combined, they span the width 652 of the keypad 616. The positions 700 may be arranged along the length 650 of the keypad 616 so that each of the positions 700 is vertically offset from the others. Again, the sixth position 712 and the seventh position 713 may be an exception because they may be vertically aligned with each other.

In alternative implementations (not shown), a keypad may have more or fewer positions than those that are illustrated in FIG. 7.

Each of the positions 700 may include certain features. The features present on each of the positions 700 may include button attachment features that cooperate with corresponding keypad attachment features on each of the button assemblies 100 to facilitate attachment of the button assemblies 100 to the keypad 616.

In alternative implementations, buttons (not shown) different from the button assemblies 100 may optionally be used. The buttons may be rigidly secured to the button attachment features. Switching may then occur in response to user actuation in such a manner that the buttons need not move significantly relative to the keypad. Switching may then occur in response to flexure of the buttons and/or to pressure on the buttons that is exerted without causing significant motion of the buttons.

Returning to the implementation of FIG. 7, the button attachment features and the keypad attachment features may be designed to permit pivotal motion of the button assemblies 100 relative to the keypad 616. Thus, when pressed by a user, the button assemblies 100 may perceptibly move, and may optionally provide an audible or tactile "click" when pressed far enough to activate switching.

The button attachment features may have many configurations. Any of a wide variety of clips, clasps, revolute joints, flexural pivots ("living hinges"), polyaxial joints, and/or the like may be used. More specifically, the button attachment features may include conical shapes, prisms, tetrahedrons, pyramids and/or other axi-symmetrical shapes. Alternatively, asymmetrical shapes may be used. According to some implementations, the button attachment features may have generally cylindrical shapes with ends that are beveled at an angle non-perpendicular to the side wall of the cylinder. Such a beveled end may facilitate attachment, for example, by causing the keypad attachment features to flex outward relative to the button attachment features, and then snap back into position with the button attachment features in engagement with the keypad attachment features. Such an arrangement may also make it more difficult to detach the buttons from the keypad, thereby preventing accidental detachment.

In the implementation of FIG. 7, the button attachment features may include a first dome 720 and a second dome 722 (shown in FIG. 6). The first dome 720 and the second dome 722 of each of the positions 700 may be generally hemispherical in shape, and may be substantially coaxial with each other. The first dome 720 and the second dome 722 may have a variety of shapes, including but not limited to hemispherical shapes, semispherical shapes (i.e., sectorial portions of spheres that are not necessarily hemispherical), elliptical shapes, parabolic shapes, and the like.

In addition to the first dome 720 and the second dome 722, each of the positions 700 may have a port 724 and an illumination aperture 726. Each port 724 may be positioned over a corresponding location on the circuit board 618 at which there is a switching element that can be activated via pressure. A feature of each button assembly 100 may protrude through the port 724 to press on the corresponding portion of the circuit board in response to user actuation of the button assembly 100, as will be described subsequently.

Each illumination aperture 726 may be positioned over a corresponding location on the circuit board 618 at which there is a light source such as an LED light. Light from the light source may shine through the illumination aperture 726 to provide a backlight to the button assembly 100 that occupies its corresponding position of the positions 700 on the keypad 616, as described in connection with FIG. 1.

Lighting may be used to enhance the overall appearance of the switching system 601. If desired, the colors, brightness, flash pattern, or other aspects of light emitted by the light sources may vary across the positions 700 and/or vary over time to provide a desired ornamental effect and/or help the user distinguish which of the button assemblies 100 may be used to initiate each switching function. Such lighting parameters of the switching system 601 may be user-configurable and customizable, if desired.

As mentioned previously, the button assemblies 100 may include button assemblies 100 of various shapes and sizes. The button assemblies 100 illustrated in FIG. 7 need not be the only ones provided with the switching system 601. If desired, the switching system 601 may be provided with more button assemblies 100 than will fit on the keypad 616 at any one time, so that the user can choose from among several button assemblies 100 to select a subset that most matches his or her needs.

As indicated previously, the button assemblies 100 may include a small button assembly 602, a medium-sized button assembly 604, and a large button assembly 606, which may be implemented in accordance with the button assembly 100 described in connection with FIG. 1. The small button assembly 602 may include multiple components, such as a small button 730 and a small light guide 732. The small button 730 may only occupy a single position of the positions 700. Thus, if desired, six small buttons 730 may be attached to the keypad 616, with one small button 730 attached at each of the positions 700.

The small button 730 may have a contact surface 736 that is shaped to be pressed by a user. The contact surface 736 may be rounded as shown. The contact surface 736 may be smooth, or may have surface texturing to provide the desired feel when touched by a digit (i.e., a finger or thumb) of a user.

The small button 730 may also have a first keypad attachment feature 738 and a second keypad attachment feature 740 (shown in FIG. 6, FIG. 8, and FIG. 9), which may cooperate with the first keypad attachment feature 738 to attach the small button 730 to the keypad 616. The first keypad attachment feature 738 may mate with the first dome 720, and the second keypad attachment feature 740 may mate with the second dome 722. This mating may be in a manner that permits the small button 730 to rotate relative to the keypad 616 about the axis shared by the first dome 720 and the second dome 722. The configuration and function of the first keypad attachment feature 738 and the second keypad attachment feature 740 will be shown and described in connection with FIG. 8 and FIG. 9.

The small button 730 may also have a protrusion 742 that extends toward the keypad 616. When the small button 730 is attached to one of the positions 700 (for example, the first position 702), the protrusion 742 may extend into the port 724 of the first position 702. Pressure on the contact surface 736 may cause the small button 730 to rotate toward the keypad 616 such that the protrusion 742 extends further into the port 724 of the first position 702. The end of the protrusion 742 may contact and/or exert pressure on a switching element (not shown) on the circuit board 618, which may cause switching to occur.

The small light guide 732 may be implemented in accordance with the light guide 104 described in connection with FIG. 1. The small light guide 732 may nest within the small button 730, as will be shown in greater detail subsequently. The small light guide 732 may have an illumination surface 744, which may be positioned interior to the contact surface 736 when the small light guide 732 is nested within the small button 730. The small light guide 732 may also have a light port 114 that extends toward the keypad 616 and protrudes into the illumination aperture 726 at the position (for example, the first position 702) occupied by the small button assembly 602.

The medium-sized button assembly 604 and the large button assembly 606 may be configured in a manner similar to that set forth above in the description of the small button assembly 602, except that the medium-sized button assembly 604 may be larger than the small button assembly 602, and the large button assembly 606 may be larger than the medium-sized button assembly 604. More specifically, while the small button assembly 602 may occupy only one of the positions 700 as described above, the medium-sized button assembly 604 may occupy two of the positions 700 and the large button assembly 606 may occupy three of the positions 700.

The medium-sized button assembly 604 may have a medium-sized button 760 and a medium-sized light guide 762, which may nest together in a manner similar to that of the small button 730 and the small light guide 732 of the small button assembly 602. The medium-sized button 760 may have a contact surface 766, a first keypad attachment feature 738, a second keypad attachment feature 740, and a protrusion 742, which may be configured substantially as described above.

The medium-sized light guide 762 may have an illumination surface 778. If desired, the medium-sized light guide 762 may have two light ports 114. Since the medium-sized button assembly 604 may occupy two of the positions 700, the medium-sized light guide 762 may be illuminated through two of the illumination apertures 726 of the keypad 616. Instead, if desired, the medium-sized light guide 762 may be made to receive light from only one of the illumination apertures 726.

The large button assembly 606 may have a large button 770 and a large light guide 772, which may nest together in a manner similar to that of the small button 730 and the small light guide 732 of the small button assembly 602. The large button 770 may have a contact surface 776, a first keypad attachment feature 738, a second keypad attachment feature 740, and a protrusion 742, which may be configured substantially as described above.

Similarly, the large light guide 772 may have an illumination surface 784 and a light port 114. If desired, the large light guide 772 may alternatively have two or three light ports 114, since it occupies three of the positions 700.

The small button assembly 602, the medium-sized button assembly 604, and the large button assembly 606 are all merely exemplary; a wide variety of other buttons (not shown) may be used. Such buttons may include a variety of switches including levers, and the like. Such buttons may also include sliding switches, knobs, and/or other controls that provide a range of adjustability in addition to or in place of simple binary (for example, on/off) functionality.

Additionally, the buttons may include one or more blanks that can be used to cover and/or protect any positions 700 on the keypad 616 that will not be otherwise occupied. However, it should be noted that blanks may be undesirable. For example, the use of blanks may give an unfinished appearance. Instead, the systems and methods described herein allow for configuring the switch requirements of an installation with just what the user requires without needing blanks. The installer just changes the size of one or two buttons to fill the open space.

Figure 8:
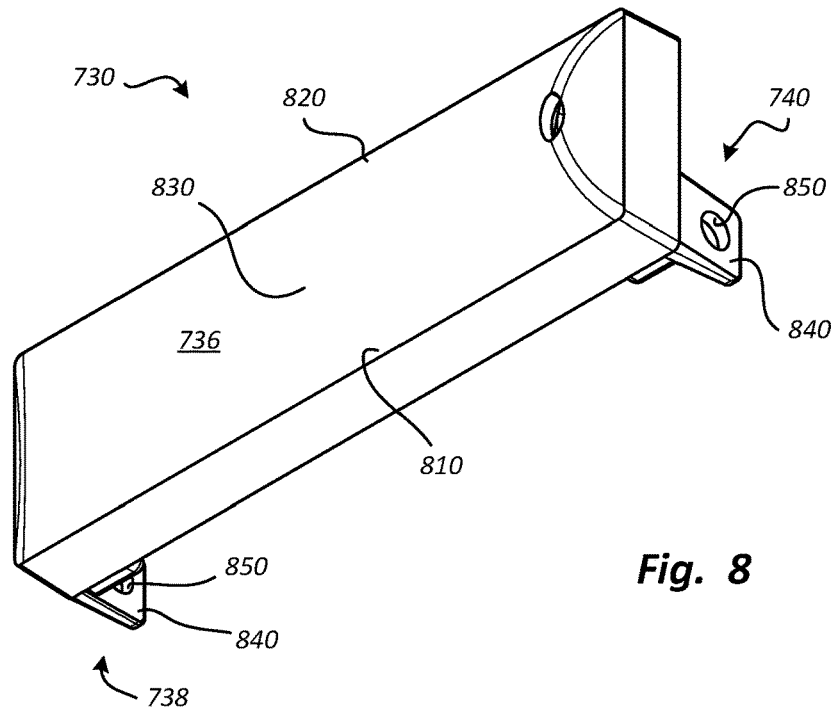
FIG. 8 is a perspective view illustrating a front side of the single-unit high small button of the button assembly of FIG. 1.

Referring to FIG. 8, a perspective view illustrates a front side of the single-unit high small button 730 of the button assembly 100 of FIG. 1. The small button 730 may be implemented in accordance with the button 102 described in connection with FIG. 1 and FIG. 2. As shown, the small button 730 may have a first end 810, a second end 820, and an intermediate portion 830 between the first end 810 and the second end 820. The first keypad attachment feature 738 and the second keypad attachment feature 740 may be positioned on the first end 810. The protrusion 742 (shown in FIG. 7 and FIG. 9) may be positioned on the second end 820. The contact surface 736 may be positioned on the intermediate portion 830.

As mentioned previously, the first keypad attachment feature 738 and the second keypad attachment feature 740 may have a wide variety of configurations according to the described implementation. As shown in FIG. 8, the first keypad attachment feature 738 and the second keypad attachment feature 740 may each have a tab 840 with a hole 850 that passes through the tab 840. The hole 850 of the first keypad attachment feature 738 may be substantially collinear with the hole 850 of the second keypad attachment feature 740.

The first keypad attachment feature 738 may be mated with the first dome 720 by inserting the first dome 720 into the hole 850 of the first keypad attachment feature 738. Similarly, the second keypad attachment feature 740 may be mated with the second dome 722 by inserting the second dome 722 into the hole 850 of the second keypad attachment feature 740. These two mating steps may cooperate to attach the small button 730 to the keypad 616.

As shown in FIG. 6 and FIG. 7, the first dome 720 and the second dome 722 of each of the positions 700 may protrude outward. The first dome 720 and the second dome 722 may be collinear as described above, and may also be spaced relative to each other at approximately the same spacing (or a slightly smaller spacing) as that which exists between the tabs 840 of the first keypad attachment feature 738 and the second keypad attachment feature 740. The spacing between the tabs 840 may advantageously be small enough that the first dome 720 and the second dome 722 are unable to be inserted into the holes 850 without some outward motion of the tabs 840.

Thus, in order to attach the small button 730 to one of the positions 700, the tabs 840 may be flexed gently outward to enable the first dome 720 and the second dome 722 to pass into the holes 850. In the alternative, flexure of the contact surface 736 may be performed to angle the tabs 840 apart from each other to enable them to fit around the first dome 720 and the second dome 722.

Once the tabs 840 have cleared the first dome 720 and the second dome 722 such that the first dome 720 and the second dome 722 are aligned with the holes 850, the tabs 840 may snap back into their undeflected configuration in which they are substantially parallel to each other, as shown in FIG. 8. The first dome 720 and the second dome 722 may, at this point, be positioned in the hole 850 of the first keypad attachment feature 738 and in the hole 850 of the second keypad attachment feature 740, respectively.

Figure 9:
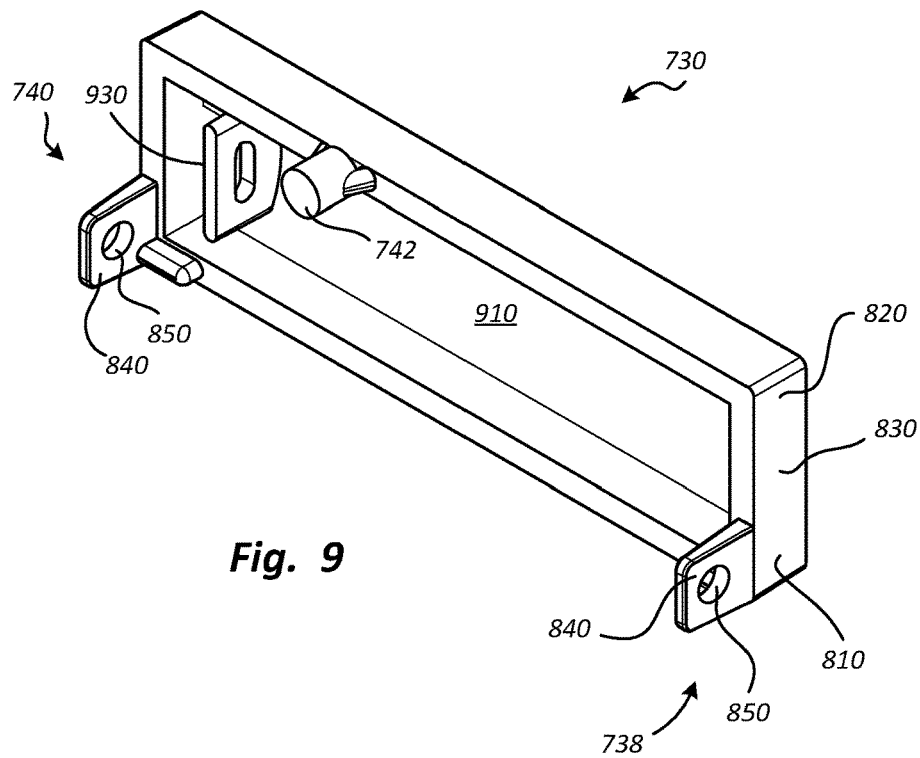
FIG. 9 is a perspective view illustrating a rear side of the single-unit high small button of the button assembly of FIG. 1.

Referring to FIG. 9, a perspective view illustrates a rear side of the single-unit high small button 730 of the button assembly 100 of FIG. 1. The small button 730 may be implemented in accordance with the button 102 described in connection with FIG. 1 and FIG. 2. The position of the protrusion 742 on the second end 820 of the small button 730 is more particularly shown. The rear side of the small button 730 may be shaped to define a cavity 910, which may contain the small light guide 732.

One or more flanges 930 may be provided within the cavity 910. The one or more flanges 930 may help to properly position the small light guide 732 within the cavity 910. Additionally the flanges 930 may serve a structural purpose by ensuring that the small button 730 has the desired level of strength and flexural rigidity.

Figure 10:
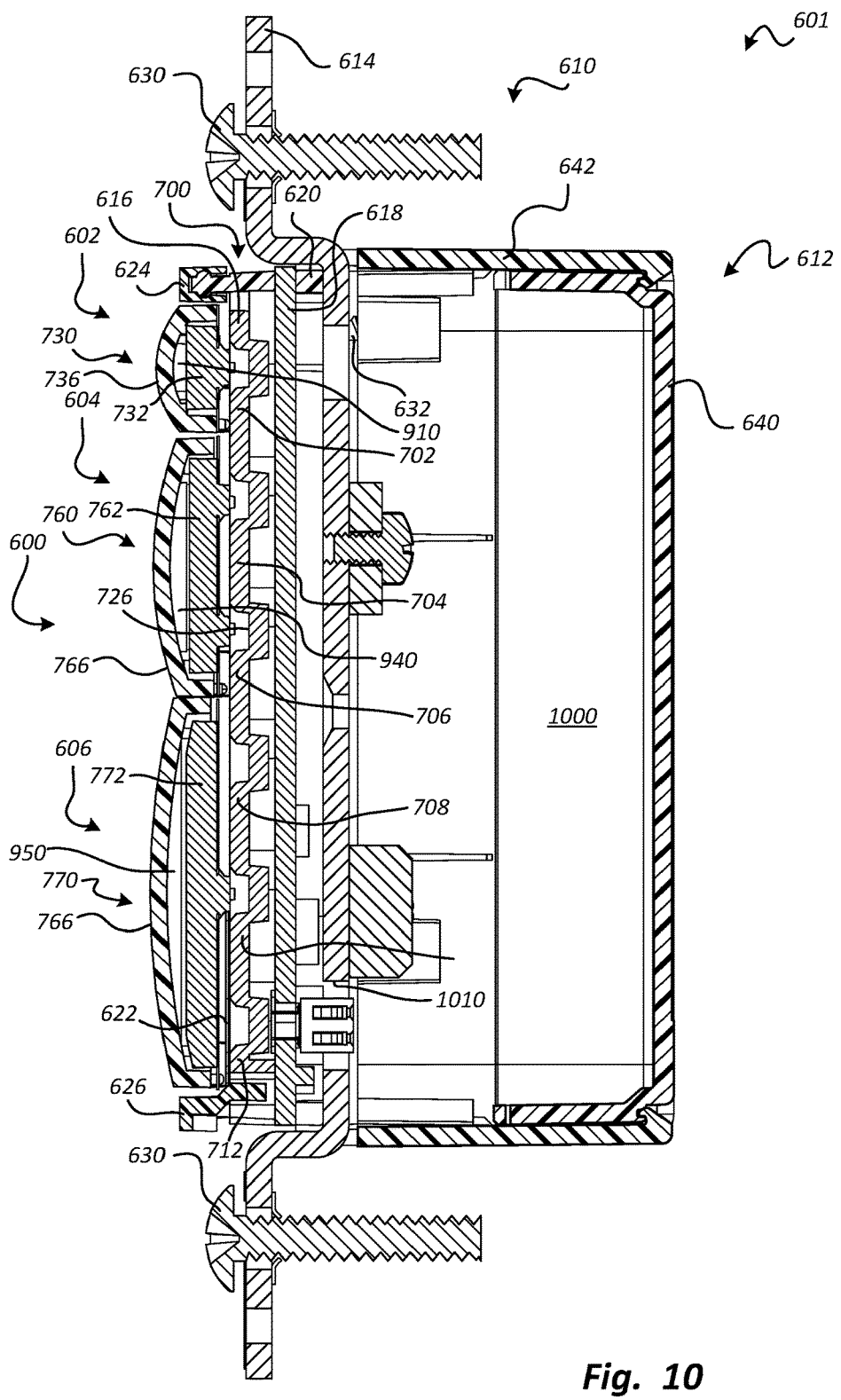
FIG. 10 is a side elevation, section view of the switching system of FIG. 6, in a fully-assembled state with the single-unit high small button, the double-unit high medium-sized button, and the triple-unit high large button of FIG. 6.

The medium-sized button 760 and the large button 770 are not shown from a rearward vantage point, but may have a cavity 940 and a cavity 950, respectively (shown in FIG. 10). The cavity 940 and the cavity 950 may have features similar to the posts 920 and flanges 930 illustrated in FIG. 9.

Referring to FIG. 10, a side elevation, section view through the lines labeled 10-10 of FIG. 6 illustrates the switching system 601 of FIG. 6, in a fully-assembled state with the single-unit high small button 730, the double-unit high medium-sized button 760, and the triple-unit high large button 770 of FIG. 6. The section view of FIG. 10 more clearly illustrates the interior of the shell 612, which may define a cavity 1000. The mounting flange 614 may have a port 1010 bordering the cavity 1000 to provide access to the cavity 1000 for wiring from the circuit board 618.

Additionally, FIG. 10 more clearly illustrates the manner in which the small light guide 732 nests within the small button 730 of the small button assembly 602. The medium-sized button assembly 604 and the large button assembly 606 may be assembled in a similar manner.

As also depicted in FIG. 10, the small button assembly 602 may occupy the first position 702, the medium-sized button assembly 604 may occupy the second position 704 and the third position 706, and the large button assembly 606 may occupy the fourth position 708, the fifth position 710, the sixth position 712, and the seventh position 713.

As mentioned previously, a variety of other button assemblies 100 may be used besides the small button assembly 602, the medium-sized button assembly 604, and the large button assembly 606. One type of button that may be provided with and/or used in connection with the switching system 601 is a rocker, which may be moved by the user to either of two positions to carry out two distinct switching functions.

Figure 11:
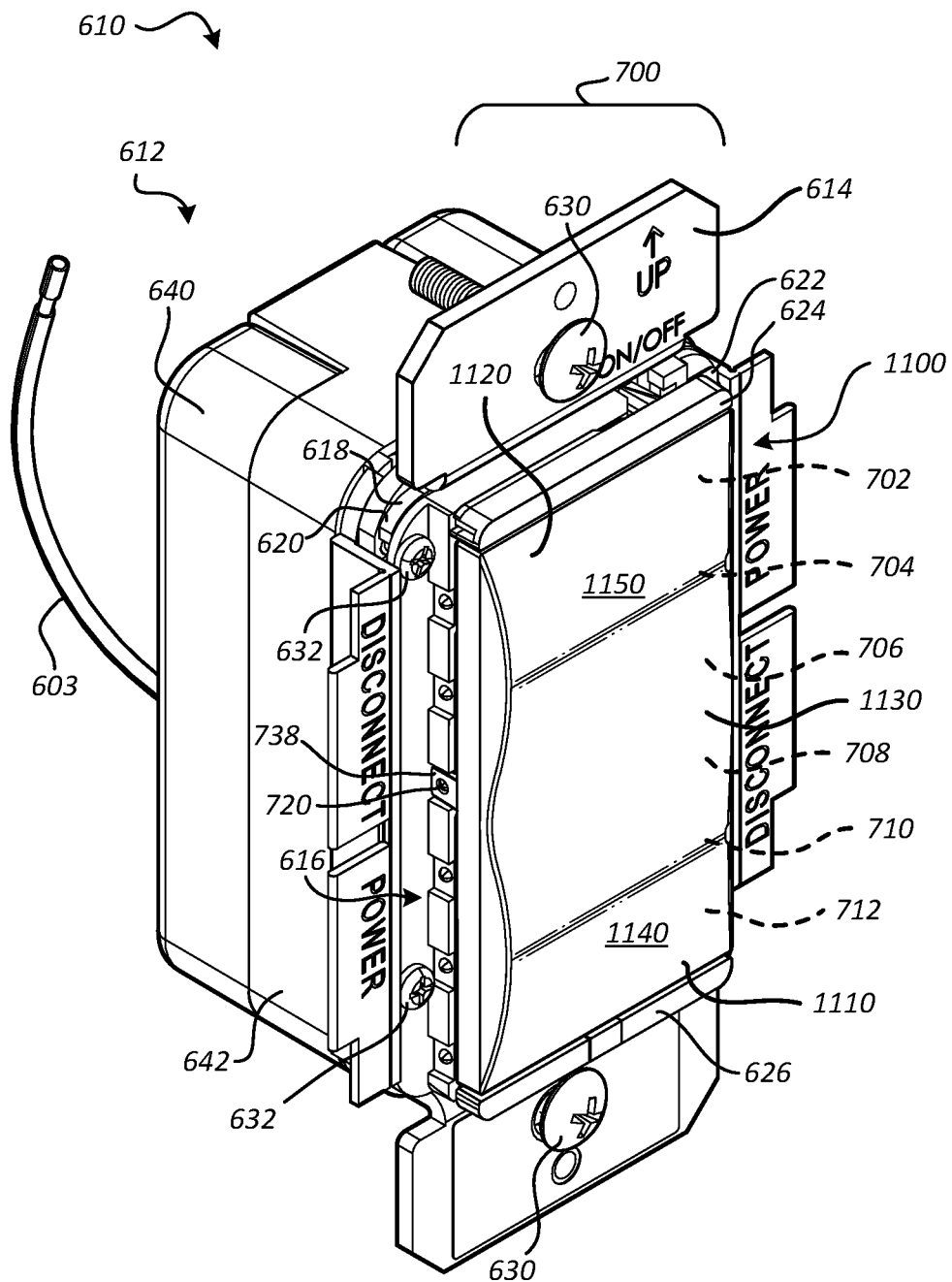
FIG. 11 is a perspective view illustrating the switching system of the system of FIG. 6, in a fully-assembled state with a button assembly in the form of a rocker.

Referring to FIG. 11, a perspective view illustrates the switching system 601 of the system of FIG. 6, in a fully-assembled state with a button assembly 100 in the form of a rocker 1100. The rocker 1100 may be implemented in accordance with the button assembly 100 described in connection with FIG. 1.

As shown, the rocker 1100 may occupy all of the positions 700 on the keypad 616. In alternative implementations (not shown), smaller rockers may be provided and attached to a keypad along with other button assemblies 100.

The rocker 1100 may have a first end 1110, a second end 1120, and an intermediate portion 1130 between the first end 1110 and the second end 1120. The rocker 1100 may have a first contact surface 1140 positioned proximate the first end 1110 and a second contact surface 1150 positioned proximate the second end 1120. The first contact surface 1140 and the second contact surface 1150 may each have a rounded shape, which may cooperate to define a central recess proximate the intermediate portion 1130.

Like the button assemblies 100 illustrated in previous Figures, the rocker 1100 may be attached to the keypad 616, and more precisely, to the first dome 720 and the second dome 722 of one of the positions 700. In the exemplary implementation of FIG. 11, the rocker 1100 may have a first keypad attachment feature 738 and a second keypad attachment feature 740 (shown in FIG. 12) positioned proximate the intermediate portion 1130. The first keypad attachment feature 738 may pivotably mate with the first dome 720 of the third position 706, and the second keypad attachment feature 740 may pivotably mate with the second dome 722 of the third position 706. Thus, the first dome 720 and the second dome 722 may cooperate to define a fulcrum about which the center of the rocker 1100 is able to rotate.

The rocker 1100 may pivot in either of two directions. If the user presses on the first contact surface 1140, the first end 1110 of the rocker 1100 may pivot toward the keypad 616 to initiate a switching function. Conversely, if the user presses on the second contact surface 1150, the second end 1120 of the rocker 1100 may pivot toward the keypad 616 to initiate a different switching function. The two switching functions may apply to the same electrical device, and may entail turning the electrical device on or off. Alternatively, the two switching functions may apply to different electrical devices and/or may initiate the performance of other functions besides turning such electrical devices on or off.

Figure 12:
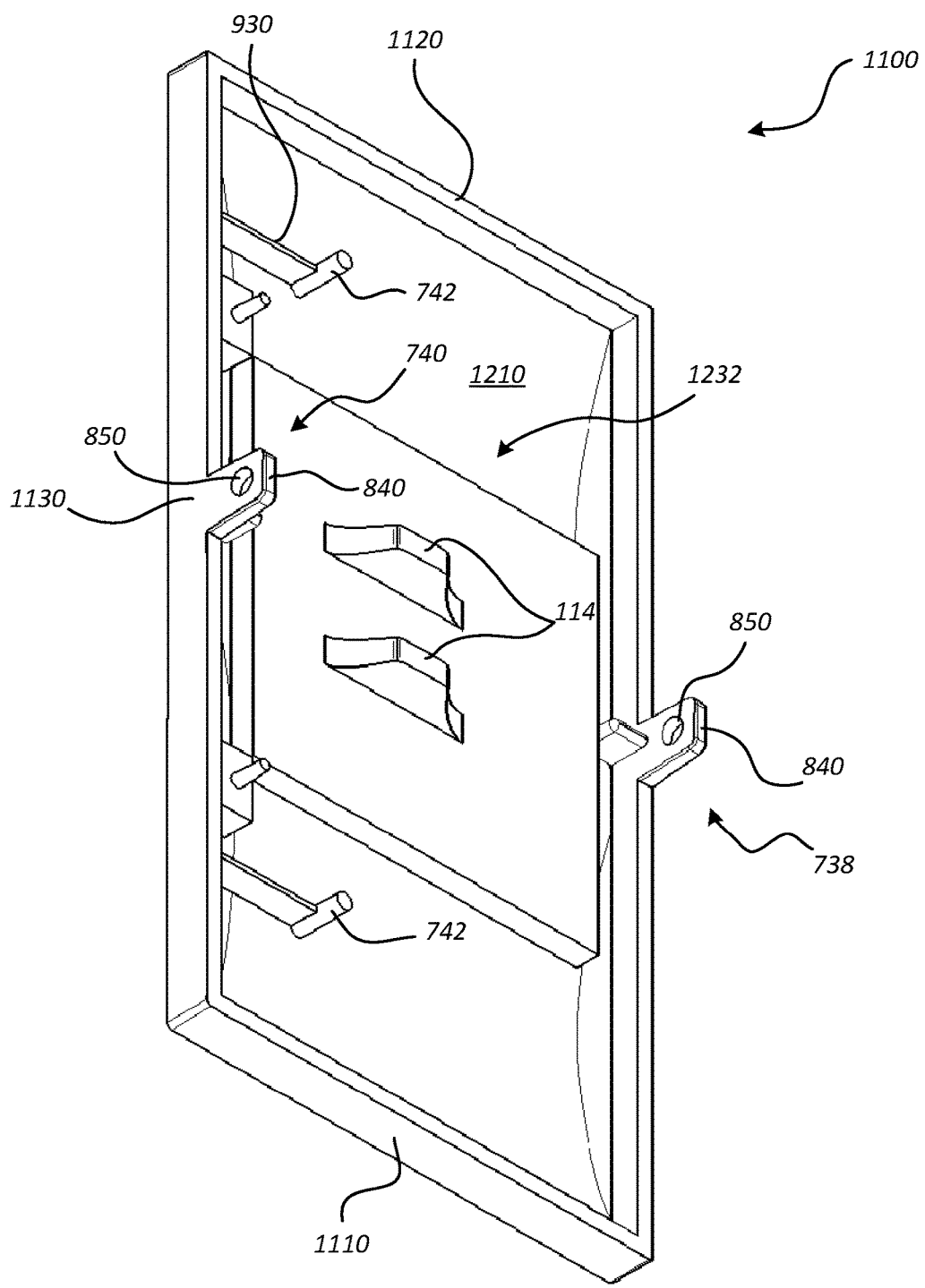
FIG. 12 is a perspective view illustrating a rear side of the rocker of FIG. 11.

Referring to FIG. 12, a perspective view illustrates a rear side of the rocker 1100 of FIG. 11. As shown, the shape of the rocker 1100 may define a cavity 1210 in the rear of the rocker 1100. Flanges 930 may extend into the cavity 1210 to provide strength or flexural rigidity to the rocker 1100, or to help retain components within the cavity 1210. More precisely, as in the button assemblies 100 shown and described previously, a light guide 1232 may be nested within the cavity 1210 of the rocker 1100. The light guide 1232 may have two (or optionally more or fewer) light ports 114, which may extend into the illumination apertures 726 of the keypad 616 to convey light to the first contact surface 1140 and/or the second contact surface 1150.

Additionally, the rocker 1100 may have two protrusions 742 that extend toward the keypad 616 when the rocker 1100 is attached to the keypad 616 as in FIG. 11. One of the protrusions 742 may be positioned proximate the first end 1110, and the other may be positioned proximate the second end 1120.

The switching systems described herein may be applied in a wide variety of ways. One exemplary method will be shown and described in connection with FIG. 13.

Figure 13:
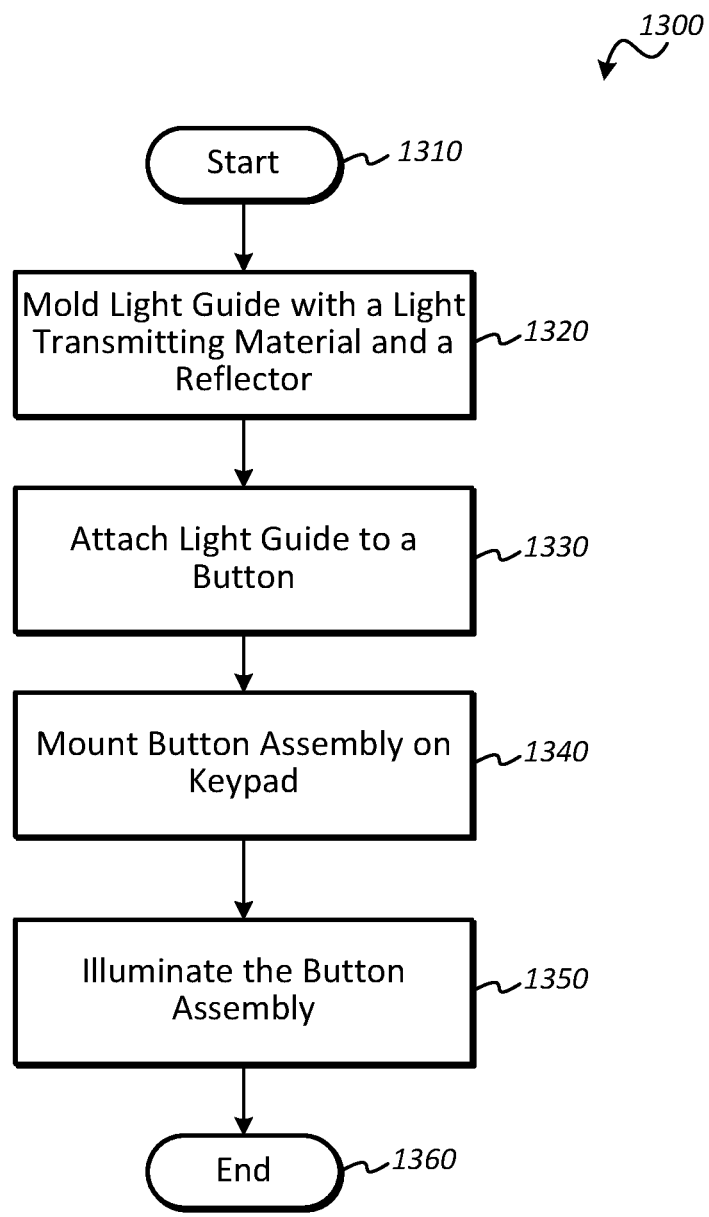
FIG. 13 is a flowchart diagram illustrating a method for providing backlighting for a modular switching system, according to one implementation.

Referring to FIG. 13, a flowchart diagram illustrates a method 1300 for providing backlighting for a modular switching system, according to one implementation. The method 1300 will be described as though carried out with the button assembly 100 of FIG. 1 and the switching system 601 of FIG. 6, but may, in alternative implementations, be carried out with a different switching system.

The method 1300 may start 1310 with a step 1320 in which the light guide 104 is molded with a light transmitting material 110 and a reflector 112, as described in connection with FIG. 1. As mentioned previously, the light transmitting material 110 may be molded with the reflector 112 as an integral part of the light guide 104. This may be accomplished in a two-shot injection molding process. The light guide 104 may be molded with a snap-fit geometry to attach to the button 102.

The method 1300 may then proceed to a step 1330 in which the light guide 104 is attached to the button 102. The light guide 104 may mate inside the button 102 to illuminate the back surface 118 of the translucent interior material 106 of the button 102.

Then, in a step 1340, the button assembly 100 may be mounted at the desired position 700 on a keypad 616. Each of the positions 700 may include button attachment features that cooperate with corresponding keypad attachment features on each of the button assemblies 100 to facilitate attachment of the button assemblies 100 to the keypad 616 as shown in FIG. 6 and FIG. 7.

Upon mounting the button assembly 100 on the keypad 616, one or more light ports 114 of the light guide 104 may extend toward the keypad 616 and may protrude into a corresponding illumination aperture 726. Each illumination aperture 726 may be positioned over a corresponding location on the circuit board 618 at which there is a light source such as an LED light.

Then, in a step 1350, the mounted button assembly 100 may be illuminated. The one or more light ports 114 of the light guide 104 may receive light from the light source on the circuit board 618. The light may travel through the light guide 104 being evenly distributed on an illumination surface 218 by the curved surfaces 220 of the light transmitting material 110 and the reflector 112. The light may exit the illumination surface 218 and travel through the back surface 118 of the button 102 and exit through one or more apertures on the front surface 108 of the button 102. The method 1300 may then end 1360.

The selection and order of the steps described above is merely exemplary. In alternative implementations, steps of the method 1300 may be modified, omitted, re-ordered, and/or supplanted with additional steps.

In the above description, reference numbers have sometimes been used in connection with various terms. Where a term is used in connection with a reference number, it may refer to a specific element that is shown in one or more of the Figures. Where a term is used without a reference number, it may refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A button assembly, comprising:
a button comprising a translucent interior material and an opaque front surface with at least one aperture through which light can pass; and
a light guide comprising a light transmitting material, a reflector and at least one light port located opposite an illumination surface through which light exits the light guide, wherein the illumination surface curves outward in two directions at a point located a distance from the at least one light port, wherein light entering the light port is distributed evenly through the light transmitting material without forming a hot spot of concentrated light, the light guide being a molded part where the light transmitting material is molded with the reflector as an integral part of the light guide;
wherein the light guide provides illumination to a back surface of the button.

2. The button assembly of claim 1, wherein the light guide is configured with:
the illumination surface on the light transmitting material, wherein the illumination surface curves outward from the at least one light port in at least one location.

3. The button assembly of claim 2, wherein the reflector is molded to the light transmitting material opposite the illumination surface.

4. The button assembly of claim 2, wherein the reflector is configured with a curved surface that differs from the illumination surface curve.

5. The button assembly of claim 2, wherein the reflector is a reflecting material such that a high percentage of light that interacts with the reflector is reflected towards the illumination surface rather than refracted through a back surface of the light guide.

6. The button assembly of claim 1, wherein the light guide mates inside the button and illuminates the back surface of the translucent interior material of the button.

7. The button assembly of claim 1, wherein the light guide has a snap-fit geometry to attach to the button.

8. The button assembly of claim 1, wherein the light guide is formed in a two-shot injection molding process in which the light transmitting material is molded with the reflector.

9. The button assembly of claim 1, wherein the light transmitting material of the light guide is a moldable transparent or translucent plastic and the reflector is a moldable opaque or semi-opaque plastic.

10. The button assembly of claim 1, wherein the translucent interior material of the button is a transparent plastic with a percentage of a diffusing agent to enhance distribution of light provided by the light guide within the button.

11. The button assembly of claim 1, wherein the light guide comprises a plurality of light ports corresponding to increments of unit sizes of the button assembly, wherein the plurality of light ports compounds light from each of a plurality of light sources to provide backlighting over a larger illumination surface than that of a light guide having a single light port.

12. A light guide for a button assembly, comprising:
a light transmitting material;
a reflector, the light guide being a molded part where the light transmitting material is molded with the reflector as an integral part of the light guide; and
at least one light port located opposite an illumination surface through which light exits the light guide, wherein the illumination surface curves outward in two directions at a point located a distance from the at least one light port, wherein light entering the light port is distributed evenly through the light transmitting material without forming a hot spot of concentrated light,
wherein the light guide is configured to provide illumination to a back surface of a button.

13. The light guide of claim 12, wherein the light guide is configured with:
the illumination surface on the light transmitting material, wherein the illumination surface curves outward from the at least one light port in at least one location.

14. The light guide of claim 13, wherein the reflector is molded to the light transmitting material opposite the illumination surface.

15. The light guide of claim 13, wherein the reflector is configured with a curved surface that differs from the illumination surface curve.

16. The light guide of claim 12, wherein the light guide is formed in a two-shot injection molding process in which the light transmitting material is molded with the reflector.

17. A method for making a light guide, comprising:
molding the light guide with a light transmitting material and a reflector, where the light transmitting material is molded with the reflector as an integral part of the light guide;
molding an illumination surface on the light transmitting material, wherein the illumination surface curves outward from the at least one light port in at least one location; and
molding at least one light port located opposite the illumination surface, wherein light entering the light port is distributed evenly through the light transmitting material without forming a hot spot of concentrated light;
wherein the light guide provides illumination to a back surface of a button.

18. The method of claim 17, wherein the illumination surface curves outward in two directions at a point located a distance from the at least one light port.

19. The method of claim 17, wherein the reflector is molded to the light transmitting material opposite the illumination surface.

20. The method of claim 17, wherein the reflector is configured with a curved surface that differs from the illumination surface curve.

21. The method of claim 17, wherein the light guide is formed in a two-shot injection molding process in which the light transmitting material is molded with the reflector.

* * * * *